US011091276B2

(12) United States Patent
Clermont et al.

(10) Patent No.: US 11,091,276 B2
(45) Date of Patent: Aug. 17, 2021

(54) INTELLIGENT AIRCRAFT GROUND SUPPORT UNIT

(71) Applicant: GUINAULT S.A., Saint Cyr en Val (FR)

(72) Inventors: Lionel Clermont, Saint Cyr en Val (FR); Chafa Chaourar, Saint Cyr en Val (FR)

(73) Assignee: GUINAULT S.A., Saint Cyr en Val (FR)

( * ) Notice: Subject to any disclaimer, the term of this patent is extended or adjusted under 35 U.S.C. 154(b) by 406 days.

(21) Appl. No.: 15/743,024

(22) PCT Filed: Sep. 7, 2015

(86) PCT No.: PCT/EP2015/070414
§ 371 (c)(1),
(2) Date: Jan. 9, 2018

(87) PCT Pub. No.: WO2017/008865
PCT Pub. Date: Jan. 19, 2017

(65) Prior Publication Data
US 2018/0229860 A1    Aug. 16, 2018

(30) Foreign Application Priority Data

Jul. 16, 2015  (EP) ..................................... 15290188

(51) Int. Cl.
*B64F 1/36*   (2017.01)
*B64F 1/34*   (2006.01)
(Continued)

(52) U.S. Cl.
CPC .............. *B64F 1/364* (2013.01); *B64F 1/228* (2013.01); *B64F 1/28* (2013.01); *B64F 1/315* (2013.01);
(Continued)

(58) Field of Classification Search
CPC .... B64F 1/364; B64F 5/40; B64F 1/34; B64F 1/368; B64F 1/315; B64F 1/28;
(Continued)

(56) References Cited

U.S. PATENT DOCUMENTS 5,226,204 A      7/1993  Schoenberger et al.
6,305,484 B1 *  10/2001  Leblanc ................. B64F 1/228
                                                        180/167

(Continued)

FOREIGN PATENT DOCUMENTS

WO    2007040448 A1    4/2007
WO    2011034992 A2    3/2011

OTHER PUBLICATIONS

International Search Report dated Apr. 6, 2016 for International Application No. PCT/EP2015/070414 filed Sep. 7, 2015.

(Continued)

*Primary Examiner* — Dale W Hilgendorf
(74) *Attorney, Agent, or Firm* — Blue Filament Law PLLC

(57) ABSTRACT

An aircraft ground support unit, which is mobile, for supplying a service to an aircraft on the ground according to a specific servicing program is provided that includes a GPS to identify an instantaneous position of the ground support unit, a receiver suitable for identifying an aircraft by receiving information emitted by a transponder of said aircraft including one or more of: an instantaneous GPS coordinates of an aircraft position, an identity of the aircraft, a type of aircraft, a company of the aircraft, or aircraft status data, and a microprocessor configured for calculating a distance, d, of the aircraft from the ground support unit, selecting a predefined specific servicing program stored in a database corresponding to the type and company of the thus identified aircraft, controlling the ground support unit to implement (Continued)

the thus selected specific servicing program, and logging aircraft and ground unit data for airlines optimization.

14 Claims, 2 Drawing Sheets

(51) Int. Cl.
    *B64F 5/40*           (2017.01)
    *B64F 5/20*           (2017.01)
    *B64F 1/22*           (2006.01)
    *B64F 1/28*           (2006.01)
    *B64F 1/315*          (2006.01)
    *G05D 1/02*          (2020.01)
    *G07C 5/00*          (2006.01)

(52) U.S. Cl.
    CPC ............... *B64F 1/34* (2013.01); *B64F 1/368* (2013.01); *B64F 5/20* (2017.01); *B64F 5/40* (2017.01); *G05D 1/0278* (2013.01); *G07C 5/008* (2013.01); *B64F 1/225* (2013.01)

(58) Field of Classification Search
    CPC . B64F 1/228; B64F 5/20; B64F 1/225; G07C 5/008; G05D 1/0278
    See application file for complete search history.

(56) References Cited

U.S. PATENT DOCUMENTS

| | | | | |
|---|---|---|---|---|
| 8,344,933 | B1* | 1/2013 | Kronfeld | G01S 7/006 342/25 R |
| 9,108,730 | B2* | 8/2015 | Grossman | B64F 5/50 |
| 9,824,591 | B1* | 11/2017 | Ryan | G08G 5/0013 |
| 2002/0155833 | A1* | 10/2002 | Borel | H04B 7/18506 455/431 |
| 2003/0093187 | A1* | 5/2003 | Walker | B64C 13/20 701/1 |
| 2004/0054448 | A1* | 3/2004 | Ito | G08G 5/0065 701/14 |
| 2008/0266166 | A1* | 10/2008 | Schuchman | G07C 5/008 342/37 |
| 2011/0032123 | A1* | 2/2011 | McGuffin | G08G 5/0013 340/961 |
| 2011/0127366 | A1* | 6/2011 | Becker | B64F 1/228 244/50 |
| 2013/0168499 | A1 | 7/2013 | Grossman | |
| 2014/0081483 | A1* | 3/2014 | Weinmann | G08G 5/0082 701/14 |
| 2014/0249736 | A1* | 9/2014 | Beda | G05D 1/0297 701/120 |
| 2015/0206439 | A1* | 7/2015 | Marsden et al. | B60T 7/16 180/167 |
| 2015/0269790 | A1* | 9/2015 | Batcheller | G08G 1/20 701/537 |
| 2015/0353192 | A1* | 12/2015 | Morrison | B64C 27/08 244/17.23 |
| 2016/0171899 | A1* | 6/2016 | Depare | G08G 5/065 701/120 |
| 2016/0196754 | A1* | 7/2016 | Surace | G08G 5/0082 701/117 |
| 2016/0236790 | A1* | 8/2016 | Knapp | B64C 11/001 |
| 2017/0060127 | A1* | 3/2017 | Alonso Tabares et al. | B64F 1/315 |
| 2020/0159224 | A1* | 5/2020 | Rupnik et al. | G05D 1/0278 |

OTHER PUBLICATIONS

Wikipedia, "Automatic dependent surveillance—broadcast", last edited on Mar. 15, 2018 (Retrieved from the Internet on Mar. 21, 2018), 19 pages; https://en.wikipedia.org/wiki/Automatic_dependent_surveillance_%E2%80%93_broadcast#1090_MHz_extended_squitter.
https://www.flightradar24.com/.

* cited by examiner

INTELLIGENT AIRCRAFT GROUND SUPPORT UNIT

TECHNICAL FIELD

The present invention concerns a ground support unit for servicing an aircraft on the ground according to a specific and pre-established servicing program. The services provided by such ground support unit include supplying electrical, pneumatic, hydraulic, or thermal power to an aircraft, supplying fuel or de-icing fluids, towing and taxiing an aircraft, and providing access to the interior of the aircraft to cargo, baggage, catering, equipment, or passengers. Each of these services must be provided according to a specific servicing program which depends on the type of aircraft, the company fretting it, and the like. The present invention permits a ground support unit to identify an aircraft ready for servicing and located in its vicinity on the ground, and to automatically retrieve a specific servicing program adapted to said aircraft.

BACKGROUND OF THE INVENTION

Most airline aircraft are equipped by law with a transponder identifying in real time to the competent air traffic control authorities the type of aircraft, the company fretting it, its registration number, its flight schedule, as well as its instantaneous position thanks to a GPS. This allows of course a more efficient control of the air traffic than radars alone. Air traffic can also be followed on line and in real time for example on commercial aviation tracking websites that provide in: the position on a map of all aircraft having their transponder switched on. Clicking on a particular plane will pop up a window with a picture of the aircraft and various identification details. Traditionally, pilots used to switch off their transponders shortly after landing. Recent legislation tends to impose the pilots to maintain their transponder on until the aircraft reaches its parking position.

When stationed at their parking positions between a landing and a take-off, aircraft require a number of servicing. For example, an aircraft needs refuelling and it must be supplied with electrical and pneumatic or hydraulic power, so that all its powered functions may remain operational with its engines off when parked on the ground. The cockpit needs be heated or cooled down depending on the local weather conditions. An aircraft may need to be towed or taxied from one point to another of the tarmac. Mobile staircases or a transit sleeve may have to be coupled to a door of the aircraft for transit of passengers. These and other services are carried out by corresponding aircraft ground support units. Some of these ground support units are mobile, such as fuel trucks, de-icing trucks, taxiing tractors, while others are fixed at least at one point, such as transit sleeves for passenger's transit, pipes for blowing hot or cool air into the cockpit of an aircraft, and the like. All of these aircraft ground services share in common that such services must be carried out according to a specific servicing program. The servicing programs may vary depending on the type of aircraft and on the company fretting it. For example, the servicing program for one of the foregoing services for an A320™ model aircraft made by Airbus S.A.S. cannot be the same as the one for a 747™ model aircraft made by The Boeing Corporation. Similarly, the servicing program for an A320™ model aircraft fretted by British Airways Plc is not necessarily the same as the one for an A320™ fretted by Deutsche Lufthansa AG. For example, only few aircraft types allow cabin cooling by means of deep cold air (−18° C. for A380™), other aircrafts being limited to +1° C. For example some aircraft require the supplied power to be limited to a certain value during engine start, each value varying from one aircraft to another.

Before initiating a servicing to an aircraft, an operator of a corresponding ground support unit must therefore first identify the aircraft type and company, check in a list the specific servicing program corresponding to said aircraft, and operating the ground support unit accordingly. With the emergence of the low costs flights, the time an aircraft remains stationed on the ground between a landing and a take-off has been reduced substantially. It results that less time is available to complete all the services required during the station of the aircraft, which has a detrimental effect on human errors. Any error may have substantial consequences on the aircraft security. For example if an electrical power supply unit supplies current at a higher intensity than admitted by a given aircraft, the electrical system of the aircraft can be damaged. If refuelling is incomplete or de-icing only partial, consequences may be dire. Allowing sub-zero cooling air in an aircraft not designed to allow subzero temperatures will lead to aircraft damage, and flight delay. Furthermore, the operation parameters of the ground support unit may need to be amended depending on the actual conditions (e.g., of temperature) inside the aircraft. Dual cooling from a ground support unit and from the Auxiliary Power Unit (APU) of the aircraft must be avoided for obvious reasons of reduction of power consumption.

There remains a need in the art for optimizing the servicing of aircrafts on the ground and, in particular, to ensure that the proper servicing program is applied to each particular aircraft. The present invention proposes a ground support unit provided with a system allowing the automatic identification of a specific aircraft and selection of the specific servicing program corresponding to the identified aircraft. It also allows the optimization of the servicing parameters depending on the actual status of the aircraft, including but not limited to cabin or mixing chamber temperatures, APU ON-OFF status. These and other advantages of the present invention are presented in the next sections.

SUMMARY OF THE INVENTION

The present invention is defined in the appended independent claims. Preferred embodiments are defined in the dependent claims. In particular, the present invention concerns an aircraft ground support unit for supplying a service to an aircraft on the ground according to a specific servicing program, said ground support unit comprising:

(a) receiver suitable for identifying an aircraft in motion or parked on the ground by receiving information emitted by a transponder of said aircraft including instantaneous GPS coordinates of the aircraft position, the identity of the aircraft, the type of aircraft, and the company fretting the aircraft, other status data as aircraft temperature, APU status and (b) a microprocessor suitable for,
   selecting a specific servicing program which is predefined and stored in a database, on the basis of the identity, type, and/or company of the aircraft identified by the reception means, and
   controlling the aircraft ground support unit to implement the thus selected specific servicing program for supplying the service to the aircraft There are many ground support units required for servicing an aircraft on the ground. In particular they include:

(a) a ground electrical power supply unit, (b) a ground pneumatic or hydraulic power unit,
(c) a ground thermal heating unit for heating or cooling an aircraft,
(d) an aircraft push back and taxiing tractor,
(e) an aircraft de-icing unit,
(f) a ground fuel supply unit,
(g) a loading unit for loading cargo, baggage, catering, or equipment,
(h) a mobile aircraft passenger stairway,
(i) a transit sleeve to be coupled to a door of the aircraft for passengers transit.

The services provided by the foregoing types of ground support units must be carried out according to a specific servicing program, comprising various parameters to be respected. For example, the following parameters can be cited:
(a) in a ground electrical power supply: a supply time, a supply power, a supply energy, a current upper limit, a supply voltage, a supply frequency;
(b) in a ground pneumatic or hydraulic power supply unit: a supply time, a supply power, a supply energy, a pneumatic or hydraulic pressure upper limit, a supply flow
(c) in a ground thermal heating unit for heating or cooling an aircraft: a supply time, a target temperature, a maximum allowed air blowing pressure, a maximum allowed blowing air flow rate, a minimum blowing air temperature, an aircraft mixing chamber defrosting cycle, a supply power, a supply energy,
(d) in an aircraft towing and taxiing tractor: maximum aircraft weight, destination, maximum pushing/towing force, maximum pushing/towing speed
(e) in an aircraft de-icing unit: maximum aircraft height, wings span, recommended fluid quantity, spraying flow rate and pressure, allowed fluid type
(f) in a ground fuel supply unit: a maximum fuel quantity, fuel type, height of the fuel tanks inlets, size of the fuel tank inlet
(g) in a loading unit for loading cargo, baggage, catering, or equipment: height of the access opening, size of the access opening
(h) in a mobile aircraft passenger stairway: an access door height;
(i) in a transit sleeve: an access door height.

In particular for mobile ground support units, which may be stationed at a certain distance from an aircraft to be serviced, it is preferred that the reception means be capable of receiving information emitted by the transponder of an aircraft from a distance of at least up to 30 m, preferably at least up to 50 m. For static ground support means, like a transit sleeve, the aircraft must anyway park very close to the gate to allow the coupling of the transit sleeve to the aircraft door, that it is sufficient that the reception means be capable of receiving information emitted by the transponder of an aircraft from a much shorter distance.

For mobile ground support units, it is advantageous if such mobile units comprise a GPS, wherein the microprocessor can calculate the distance, d, of the identified aircraft from said ground support unit.

In a preferred embodiment, the microprocessor is in communication with a central processor located remote from the ground support unit. The central processor may actively manage a fleet of mobile ground support units, sending them to specific aircrafts, or passively managing said fleet, by following the position of each unit and correlating this data with the position of the nearest aircraft and of whether a unit is in operative mode or in rest mode.

In yet a preferred embodiment, the microprocessor is suitable for recording information including an actual servicing time, an energy consumption, and an unexpected event including a technical problem arisen during servicing of an identified aircraft. In this embodiment, the microprocessor is suitable for sending the thus recorded information to a central processor for further treatment, including treatment of a problem with said ground support unit and/or establishment of an invoice.

The microprocessor may further be suitable for receiving data from the transponder concerning the instant status of the aircraft, comprising a value of one or more of an instant temperature of a mixing chamber, an instant temperature of a cabin, an activation or not of an auxiliary power unit (APU), a level of remaining fuel in tanks, a relative moisture in a cabin. In this embodiment, the microprocessor can be programmed to optimize within a predefined range the servicing program selected as a function of the data received on the instant status of the aircraft. For example, in case the data indicates that the APU is activated while a ground support unit is coupled to the aircraft, the microprocessor may send a message to the pilot informing that the ground support unit is coupled to the aircraft and operative, and that the APU may possibly be redundant. The pilot can then decide whether or not to switch off the APU.

Because ADS-B type transponders seem to impose themselves as the most secure type of transponders, it is advantageous if the reception means are suitable for receiving information from a transponder of the type ADS-B (=automatic dependent surveillance-broadcast). It is also advantageous if the reception means are suitable for receiving signals of the type 1090 MHz extended.

The present invention also concerns the use of a receiver for selecting a specific servicing program from a database to be used by a ground support unit on a specific aircraft on the ground. Said selection is based on information received from said receiver emitted by a transponder of said specific aircraft, wherein said aircraft ground support unit is suitable for supplying a service to said aircraft on the ground according to said specific servicing program. The information comprises for example the instantaneous GPS coordinates of the aircraft position, the identity of the aircraft, the type of aircraft, and the company fretting the aircraft. In a preferred embodiment, the information further comprises data concerning an instant status of the aircraft, including a value of one or more of an instant temperature of a mixing chamber, an instant temperature of a cabin, an activation or not of an auxiliary power unit (APU), a level of remaining fuel in tanks, a relative moisture in a cabin. Based on said data, the receiver can be further used to optimize the servicing program within a predefined range allowed by said servicing program.

The microprocessor is suitable for optimizing within a predefined range the servicing program selected as a function of the data received on the instant status of the aircraft.

In one embodiment, the reception means are mounted on said ground support unit. In an alternative embodiment, the reception means are mounted at a parking station of said ground support unit, where said ground support unit is stationed between two uses thereof.

The reception means can be used for selecting the following servicing programs for the following types of services:
(a) Supply of electrical power to an aircraft on the ground according to a specific servicing program including a supply time, a supply power, a supply energy, a current upper limit, a supply voltage, a supply frequency;

(b) Supply of pneumatic or hydraulic power to an aircraft on the ground according to a specific servicing program including a supply time, a supply power, a supply energy, a pressure upper limit, a supply flow;

(c) Supply or withdrawal of thermal energy for heating or cooling an aircraft on the ground according to a specific servicing program including a supply time, a target temperature, a maximum allowed air blowing pressure, a maximum allowed blowing air flow rate, a minimum blowing air temperature, an aircraft mixing chamber defrosting cycle, a supply power, a supply energy.

(d) moving and taxiing an aircraft on the ground according to a specific servicing program including a maximum aircraft weight, a destination, a maximum pushing/towing force, a maximum pushing/towing speed;

(e) de-icing movable outer elements of an aircraft according to a specific servicing program including maximum aircraft height, wings span, recommended fluid quantity, allowed fluid type;

(f) supply of fuel to an aircraft on the ground according to a specific servicing program including maximum fuel quantity, fuel type, height of the fuel tanks inlets, size of the fuel tank inlet;

(g) loading of cargo, catering, or equipment according to a specific servicing program including height of the access opening, size of the access opening;

(h) coupling a mobile aircraft passenger stairway according to a specific servicing program including access door height, (i) The reception means can be used for adjusting the performance of the ground support unit based on the status data provided by the aircraft transponder (mixing chamber temperature, cabin temperature, APU status ON_OFF)

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 3:
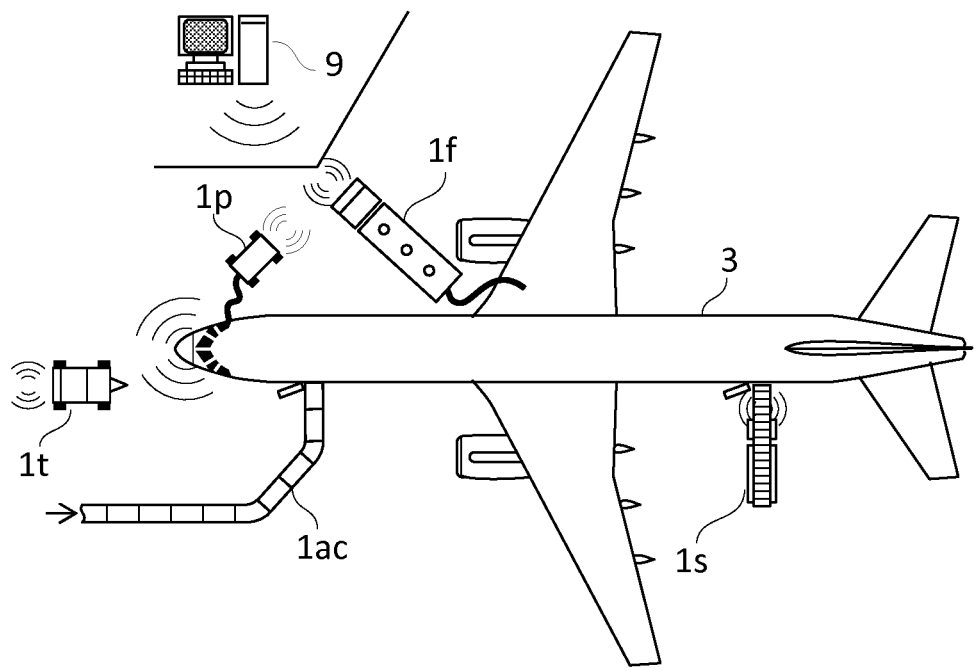
FIG. 3: shows a top view of an aircraft on the ground surrounded by a number of ground support units either in direct communication with a transponder of the aircraft, or with a central server which is in direct communication with said transponder.

As illustrated in FIG. 3, during its stay on the ground between a landing and a take-off, an aircraft must be serviced by a number of ground support units for providing the various services required for the functioning, comfort, and security of the aircraft. For example, FIG. 3 shows a power supply unit (1p) supplying the aircraft with electrical, pneumatic, or hydraulic power; the aircraft is re-fuelled with a refuelling truck (1f); a mobile stairway (1s) or a transit sleeve (not shown) must be coupled to a door of the aircraft to allow transit of the passengers; an air conditioning pipe (1ac) is coupled to a door of the aircraft to blow hot or cold air into the cockpit to control the temperature inside the aircraft; a taxiing or towing truck (1t) can move the aircraft to a desired location. Other services may be required which are not shown in FIG. 3. For example in case of freezing temperatures, some movable parts of the aircraft need be sprayed with a de-icing solution prior to take-off; cargoes, baggage, catering, or other equipment may have to be loaded via conveyor belts or rising platforms. Each of the foregoing services must be carried out according to an accurate servicing program established by each airline company depending on the aircraft model, or even depending on a specific aircraft as a function of its airport of origin, the next destination, the mileage since the last servicing, and the like.

As discussed in the background art, prior to initiating a service, an operator must first identify the aircraft, enter the identification into a computer to retrieve the specific servicing program corresponding to the identified aircraft, and implement said servicing program into the ground support unit required for carrying out said service. This process is slow and open to many errors of transcriptions.

The ground support unit operation might require aircraft status data to optimize operation (aircraft temperature, mixing chamber temperature, APU status . . . )

To solve these problems, the present invention proposes an aircraft ground support unit (1) for supplying a service to an aircraft (3) on the ground according to a specific servicing program, wherein said ground support unit comprises:

(a) A receiver (5) suitable for identifying an aircraft (3) in motion or parked on the ground by receiving information emitted by a transponder (7) of said aircraft including an instantaneous GPS coordinates of the position of the aircraft, the identity of the aircraft, the type of aircraft, and the company of the aircraft, (b) A microprocessor suitable for selecting and implementing a predefined servicing program stored in a database corresponding to the type and company of the thus identified aircraft (3) on the basis of the information received by the reception means.

The receiver (5) allows for an instantaneous and error-free identification of a specific aircraft registration number, model, and company. This operation carried out manually is a great source of errors in the selection of the specific servicing program corresponding to said aircraft. The identification data of the specific aircraft are therefore entered into the system and supplied to the microprocessor without any human intervention. Based on the identification data thus received, the microprocessor retrieves the specific servicing program corresponding to the aircraft thus identified, and controls the ground support unit to implement the selected specific servicing program to the identified aircraft.

Figure 2:
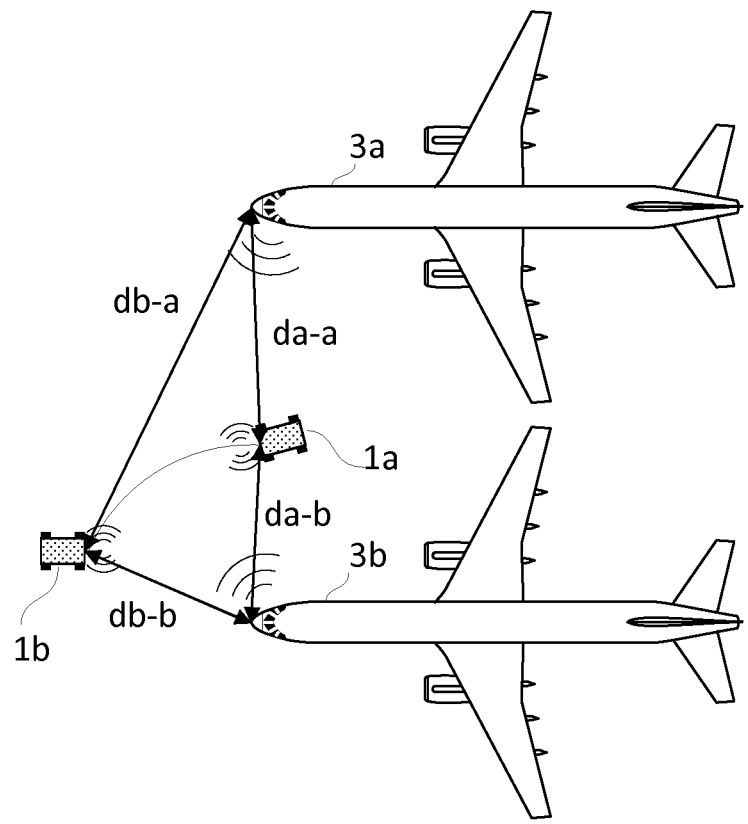
FIG. 2: shows a top view of two aircrafts standing side by side on the ground, with two ground support units in communication with the transponders of each aircraft.

In a preferred embodiment, a ground support unit is mobile and is equipped with a GPS to identify the instantaneous position thereof, and the microprocessor is able to calculate the distance, d, between said mobile ground support unit and the aircraft. The microprocessor of a ground support unit can be autonomous in that it can be in communication solely with the reception means and the operating functions of said ground support means. In a preferred embodiment, however, the microprocessor of a ground support unit is in communication with a central processor (9) located remote from the ground support unit. Said central processor is in communication with other ground support units and can optimize the interactions between different ground support units, or decide which unit is most suitable for servicing a given aircraft, depending on the servicing program required, on the distance to the aircraft, or on the need of an analogous service by another aircraft located nearby. This is schematically illustrated in FIG. 2, wherein a first ground support unit (1a) is located at a distance (da-a) from a first aircraft (3a) and at a distance (da-b) from a second aircraft (3b). A second ground support unit (1b) is located at a distance (db-b) to the second aircraft which is equal to the distance (da-b) from the first unit (1a). The distance (db-a) of the second unit (1b) to the first aircraft (3a), however, is much larger than the distance from the first unit (1a). In an embodiment of the present invention, the central processor compares the total distance (da-a+db-b) with the total distance (da-b+db-a) the first and second units (1a, 1b) must run depending on whether they are sent to the first or second aircraft (3a, 3b), and select the option yielding the shortest total distance. In the example illustrated in FIG. 2, (da-a+db-b)<(da-b+db-a), so that the central processor would send the first unit (1a) to service the first aircraft (3a) and the second unit (1b) to service the second aircraft (3b). In an alternative embodiment, the microprocessor of a given ground support unit can also be in communication with the microprocessors of other ground support units in the neighbourhood and exchange information.

Beside the possible communication with a central processor or with other ground support units, and beside the speed and reliability of the selection and implementation of a specific servicing program to a specific aircraft, the present invention provides other advantages. For example, the microprocessor can record information including any unexpected event such as a technical problem arisen during servicing of an identified aircraft. This information can be automatically transferred to a technical team for rapidly treating an identified problem. Furthermore, all unexpected events and dates encountered by a ground support unit are stored and can be retrieved to assess the reliability of said unit.

By establishing statistics on the frequency of use of a type of ground support units depending on the location thereof, the geographical distribution of the parking stations of the units can be optimized. An analysis of the most used ranges of values of the parameters defining a servicing program in a given geographical area of an airport may help in installing ground support units specifically designed for working in said ranges (e.g., power, height, fuel tank capacity, etc.).

By recording the actual servicing time and energy consumption of a ground support unit, the clients may be invoiced instantaneously based on the actual work performed. If flat rates are applied, they can be adapted to better match the actual consumption of the units.

The transponder can comprise numerous information concerning an aircraft, including data concerning the instant status of the aircraft. For example, the transponder can comprise a value of the instant temperature and/or relative humidity in a mixing chamber or in a cabin of an aircraft; it can comprise an actual value of the amount of fuel left in the tanks; it can indicate whether or not an auxiliary power unit (APU) is activated; and the like. With this information, the ground support unit can optimize the specific servicing program corresponding to an aircraft within a predefined range allowed by said servicing program. For example, if the instant temperature of the cabin or the mixing chamber is comprised within a certain range, the servicing program corresponding to the aircraft can be adapted by changing and optimizing the temperature of the cool air blown into the cabin by a preconditioned air ground unit (PCA). In another example, an aircraft with a large fuel capacity requiring a large fuel truck for refuelling may be serviced by a smaller truck in case the tanks are not empty.

An APU (Auxiliary Power Unit) is a small turbine engine installed in the aircraft, used primarily during aircraft ground operation to provide electricity, compressed air, air conditioning, or shaft power. The APU has a high power consumption and if it is used by a pilot to cool the cabin, while a preconditioned air ground unit (PCA) is blowing cold air in the stale cabin at the same time, the power consumption is duplicated uselessly. The same applies with a ground power unit (GPU) which provides 400 Hz power to an aircraft, requiring no intervention from an APU. In a preferred embodiment, a ground support unit according to the present invention, in particular a PCA, or a ground power unit (GPU) can be informed by the transponder whether the APU is on or off. In case the APU is on, a message or signal can be sent to the pilot informing that the a PCA or GPU is coupled to the aircraft, while the APU is on, so that the pilot can decide whether or not to switch off the APU.

The receiver (5) is preferably capable of receiving information emitted by the transponder of an aircraft from a distance of at least up to 30 m, preferably at least up to 50 m. Longer reception distances are not particularly required because an aircraft identified by a ground support unit at a greater distance is either still in motion and may be taxiing away from said unit, or if it is parked, it is probable that a second ground support unit located closer to said aircraft can be found. The reception distance of the receiver (5) of up to 50 m is desirable for mobile ground support units, which parking location can vary with time. For static ground support units such as a transfer sleeve for passenger's transit or a heating or cooling air supply pipe (lac) (often coupled to a transfer sleeve) only need shorter reception ranges, since the aircraft must park close by.

The parameters defining a specific servicing program depend on the type of services supplied by a given ground support unit (1). Table 1 lists a number of non-exhaustive examples of parameters defining a specific servicing program depending on the type of services provided by the ground support unit.

TABLE 1 examples of parameters defining a servicing program as a function of the type of ground support unit.

| Ground support unit | parameters defining a servicing program |
|---|---|
| (a) electrical power supply unit | a supply time, a supply power a supply energy a current upper limit a supply voltage a supply frequency |
| (b) pneumatic or hydraulic power supply unit | a supply time a supply power a supply energy a pressure upper limit a supply flow |
| (c) thermal heating unit | a supply time a target temperature a maximum allowed air blowing pressure a maximum allowed blowing air flow rate a minimum blowing air temperature an aircraft mixing chamber defrosting cycle a supply power, a supply energy |
| (d) towing and taxiing tractor | maximum aircraft weight maximum speed allowed destination maximum pushing/towing force |
| (e) de-icing unit | maximum aircraft height |

TABLE 1-continued examples of parameters defining a servicing program
as a function of the type of ground support unit.

| | Ground support unit | parameters defining a servicing program |
|---|---|---|
| | | wings span, |
| | | recommended fluid quantity |
| | | Spraying flow rate and pressure |
| | | allowed fluid type |
| (f) | fuel supply unit | maximum fuel quantity, |
| | | fuel type, |
| | | height of the fuel tanks inlets |
| | | size of the fuel tank inlet |
| (g) | loading unit | height of the access opening |
| | | size of the access opening |
| (h) | aircraft passenger stairway or transit sleeve | access door height |

Receiver (5) of a ground support unit according to the present invention is well known in the art and are readily available on the market. The air traffic control services routinely use such receivers for receiving signals from aircraft transponders and thus identifying the instantaneous GPS coordinates of the positions of the aircrafts. Aircrafts positions can be visualized in real time on any computer via commercial aviation tracking websites. There are different types of transponders mounted on aircrafts. To date, it would seem that ADS—B type transponders (=automatic dependent surveillance-broadcast) provide most benefits to both pilots and air traffic control, and are currently considered as improving both the safety and efficiency of flight. This type of transponders may possibly be imposed as a norm in the future. For this reason, the receiver (5) of a ground support unit according to the present invention should preferably be suitable for receiving information from a transponder of the type ADS-B. It is clear that as technology evolves, new systems will emerge, and the reception means will then have to be suitable for communicating with such new systems.

In 2002 the Federal Aviation Administration (FAA) announced a decision to use the 1090 MHz extended squitter (1090 ES) link for air carriers and operators of high-performance aircrafts as a physical layer for relaying ADS-B position reports. Again, the receiver of a ground support unit according to the present invention should preferably be suitable for receiving signals of the type 1090 MHz extended. As legislation evolves and new links are imposed, the receiver will have to adapt to the new systems. Universal access transceiver links was imposed for the typical general aviation users. A receiver suitable for the present invention should therefore preferably also be compatible with universal access transceiver links.

Figure 1:
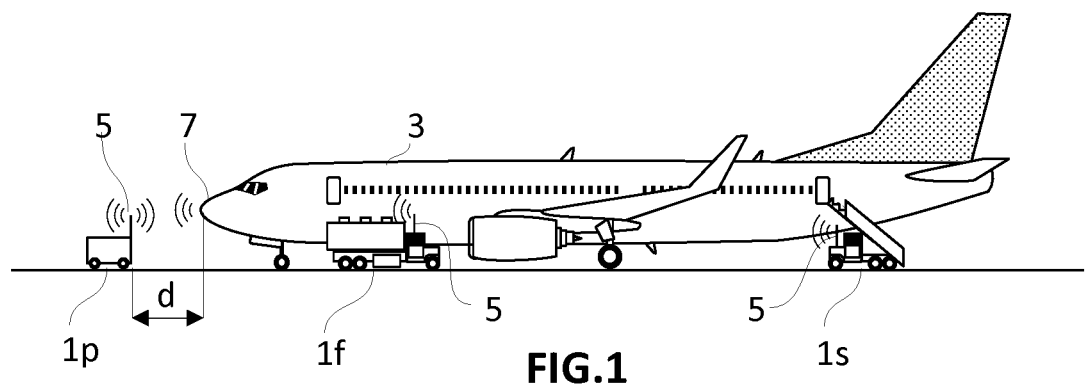
FIG. 1: shows a side view of an aircraft on the ground surrounded by a number of ground support units in communication with a transponder of the aircraft.
Figure 4:
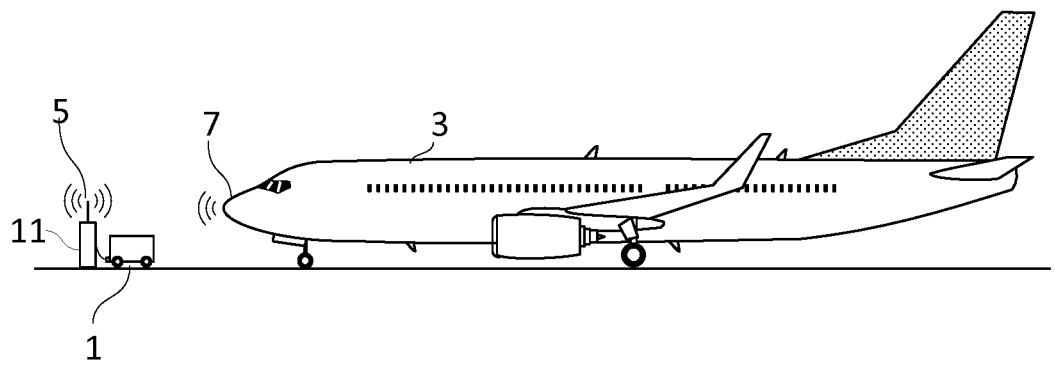
FIG. 4: shows a side view of an aircraft on the ground which transponder is in direct communication with a parking station of a ground support unit.

The use of a receiver (5) for automatically defining a servicing program to be used by a ground support unit (1) on a specific aircraft (3) on the ground, based on information received from said reception means emitted by a transponder of said specific aircraft is novel and advantageous over the existing systems which are slower and prone to human errors. Said receiver (5) can be mounted either on said ground support unit itself (cf. FIG. 1), or at a parking station (11) of said ground support unit, where said ground support unit is stationed between two uses thereof (cf. FIG. 4). It is also possible to mount the reception means on a central processor (9) which is in communication with a fleet of ground support units. The central processor determines which ground support units are to service given aircrafts and identifies the specific servicing programs to be implemented by said ground support units.

In an alternative embodiment, the central processor (9) follows the GPS position coordinates of the aircrafts on the ground, as well of the ground support units, and follows whether the latter are in operating mode or in rest mode. Even without any specific signal from the ground support units indicating that they are servicing a specific aircraft, the central processor can determine that a specific ground support unit is servicing a specific aircraft, if the distance, d, separating them is less than a predefined value (e.g., d<10 m) and if said specific ground support unit is in operating mode. This allows to have an instantaneous picture of the positions and activities of the various ground support units, which is useful for the management of the fleet of ground support units.

| REF | DESCRIPTION |
|---|---|
| 1 | aircraft ground support unit |
| 1a | first aircraft ground support unit |
| 1ac | heating or cooling air supply pipe |
| 1b | second aircraft ground support unit |
| 1f | refuelling truck |
| 1p | electrical or pneumatic power supply unit |
| 1s | mobile stairway for passengers |
| 1t | taxiing or towing truck |
| 3 | aircraft |
| 3a | first aircraft |
| 3b | second aircraft |
| 5 | Reception means |
| 7 | transponder |
| 9 | central processor |
| 11 | parking station for ground support unit |
| d | distance between a ground support unit and an aircraft |
| da-a | distance between a first ground support unit and first aircraft |
| da-b | distance between first ground support unit and second aircraft |
| db-a | distance between a second ground support unit and first aircraft |
| db-b | distance between second ground support unit and second aircraft |

The invention claimed is:

1. An aircraft ground support unit (1), which is mobile, for supplying a service to an aircraft (3) on the ground according to one of a plurality of specific servicing programs, said ground support unit comprising:
   (a) a global positioning system (GPS) to identify an instantaneous position of the ground support unit;
   (b) a receiver (5) suitable for identifying the aircraft (3) in motion or parked on the ground, by receiving information emitted by a transponder (7) of said aircraft including one or more of:
   instantaneous GPS coordinates of an aircraft position, an identity of the aircraft, a type of aircraft, a company fretting the aircraft, or aircraft status data; and
   (c) a microprocessor configured for,
   calculating a distance (d) of the aircraft from the ground support unit from the instantaneous GPS coordinates of said aircraft as emitted by the transponder (7) and from the identified instantaneous position based on GPS of the ground support unit;
   selecting a specific servicing program of the service from the plurality of specific servicing programs which is predefined and stored in a database, on the basis of the calculated distance and one or more of: the identity, the type, or the company of the aircraft identified by the receiver;
   controlling the ground support unit to implement the thus selected specific servicing program for supplying the service to the aircraft; and
   logging aircraft and ground unit data for airlines optimizations.

2. The ground support unit according to claim 1, selected from any one of a group consisting of:
(a) a ground electrical power supply unit (1p);
(b) a ground pneumatic or hydraulic power unit (1p);
(c) a ground thermal heating unit for heating or cooling the aircraft (1ac);
(d) an aircraft push back and taxiing tractor (1t);
(e) an aircraft de-icing unit;
(f) a ground fuel supply unit (1f);
(g) a loading unit for loading cargo, baggage, catering, or equipment; or
(h) a mobile aircraft passenger stairway (1s).

3. The ground support unit according to claim 2, wherein the specific servicing program includes one or more of the following parameters:
(a) in the ground electrical power supply unit, one or more of: a supply time, a supply power, a supply energy, a current upper limit, a supply voltage, or a supply frequency;
(b) in the ground pneumatic or hydraulic power supply unit, one or more of: a supply time, a supply power, a supply energy, a pneumatic or hydraulic pressure upper limit, or a supply flow;
(c) in the ground thermal heating unit for heating or cooling the aircraft, one or more of: a supply time, a target temperature, a maximum allowed air blowing pressure, a maximum allowed blowing air flow rate, a minimum blowing air temperature, an aircraft mixing chamber defrosting cycle, a supply power, or a supply energy;
(d) in the aircraft push back and taxiing tractor, one or more of: a maximum aircraft weight, a destination, a maximum pushing force, a maximum towing force, a maximum pushing speed, or a maximum towing speed;
(e) in the aircraft de-icing unit, one or more of: a maximum aircraft height, a wings span, a recommended fluid quantity, a spraying flow rate and pressure, or allowed fluid types;
(f) in the ground fuel supply unit, one or more of: a maximum fuel quantity, a fuel type, a height of a fuel tank inlet, or a size of a fuel tank inlet; or
(g) in the loading unit for loading cargo, baggage, catering, or equipment, one or more of: a height of an access opening, or a size of the access opening.

4. The ground support unit according to claim 1 wherein the microprocessor is autonomous in that it can be in communication solely with the receiver and with operating functions of the ground support unit.

5. The ground support unit according to claim 1, wherein the microprocessor is in communication with a central processor (9) located remote from the ground support unit.

6. The ground support unit according to claim 1, wherein the microprocessor is configured for recording information including one or more of: an actual servicing time, an energy consumption, or an unexpected event including a technical problem arisen during servicing of an identified aircraft.

7. The ground support unit according to claim 6, wherein the microprocessor is configured for sending the thus recorded information to a central processor (9) located remote from the ground support unit, for further treatment, including one or more of:
treatment of a problem with said ground support unit or establishment of an invoice.

8. The ground support unit according to claim 1, wherein the microprocessor is configured for receiving data from the transponder concerning an instant status of the aircraft comprising a value of one or more of: an instant temperature of a mixing chamber, an instant temperature of a cabin, an activation or not of an auxiliary power unit (APU), a level of remaining fuel in tanks, or a relative moisture in a cabin.

9. The ground support unit according to claim 8, wherein the microprocessor is configured for optimizing within a predefined range the servicing program selected as a function of the data received on the instant status of the aircraft.

10. The ground support unit according to claim 1, wherein the receiver is suitable for receiving information from the transponder (7) of a type automatic dependent surveillance-broadcast (ADS-B).

11. A method for supplying a service to a specific aircraft comprising:
providing a ground support unit (1) and identifying an instantaneous position of the ground support unit based on global positioning system (GPS) coordinates;
receiving information emitted by a transponder (7) of an aircraft (3) including instantaneous GPS coordinates of an aircraft position;
calculating a distance (d) separating the ground support unit from the aircraft based on the respective instantaneous positions of the ground support unit and the aircraft as determined by the instantaneous GPS coordinates of the ground support unit and the aircraft (3);
identifying the aircraft;
using a receiver (5) for selecting a specific servicing program from a database to be used by the ground support unit (1) on said specific aircraft (3) on the ground, based on information received by said receiver that is emitted by said transponder (7) of said specific aircraft; and
positioning said ground support unit adjacent to said specific aircraft for supplying the service to said specific aircraft on the ground according to said specific servicing program; and
wherein the ground support unit comprises:
(a) a global positioning system (GPS) to identify the instantaneous position of the ground support unit;
(b) the receiver (5) suitable for identifying the aircraft (3) in motion or parked on the ground, by receiving information emitted by the transponder (7) of said aircraft including one or more of: instantaneous GPS coordinates of the aircraft position, an identity of the aircraft, a type of aircraft, a company fretting the aircraft, or aircraft status data; and
(c) a microprocessor configured for,
calculating a distance (d) of the aircraft from the ground support unit based on the GPS coordinates of both the aircraft and the ground support unit;
selecting a specific servicing program of the service which is predefined and stored in a database, on the basis of the calculated distance and one or more of: the identity, the type, or the company of the aircraft identified by the receiver;
controlling the ground support unit to implement the thus selected specific servicing program for supplying the service to the aircraft; and
logging aircraft and ground unit data for airlines optimizations.

12. The method according to claim 11, wherein said information further comprises data concerning an instant status of the aircraft comprising a value of one or more of: an instant temperature of a mixing chamber, an instant temperature of a cabin, an activation or not of an auxiliary power unit (APU), a level of remaining fuel in tanks, or a relative moisture in a cabin, and wherein said data is used to optimize the servicing program thus selected within a predefined range allowed by said servicing program.

13. The method according to claim 11, wherein said receiver is mounted either on said ground support unit, or at a parking station (11) of said ground support unit, where said ground support unit is stationed between two uses thereof.

14. The method according to claim 11, wherein said service and said specific servicing program are selected among one or more of:
   (a) supply of electrical power to the aircraft on the ground according to the specific servicing program including one or more of: a supply time, a supply power, a supply energy, a current upper limit, a supply voltage, or a supply frequency;
   (b) supply of pneumatic or hydraulic power to the aircraft on the ground according to the specific servicing program including one or more of: a supply time, a supply power, a supply energy, a pressure upper limit, or a supply flow;
   (c) supply or withdrawal of thermal energy for heating or cooling the aircraft on the ground according to the specific servicing program including one or more of: a supply time, a target temperature, a maximum allowed air blowing pressure, a maximum allowed blowing air flow rate, a minimum blowing air temperature, an aircraft mixing chamber defrosting cycle, a supply power, or a supply energy;
   (d) moving and taxiing the aircraft on the ground according to the specific servicing program including one or more of: a maximum aircraft weight, a destination, a maximum pushing force, a maximum towing force, a maximum pushing speed, or a maximum towing speed;
   (e) de-icing movable outer elements of the aircraft according to the specific servicing program including one or more of: a maximum aircraft height, a wings span, a recommended fluid quantity, or an allowed fluid type;
   (f) supply of fuel to the aircraft on the ground according to the specific servicing program including one or more of: a maximum fuel quantity, a fuel type, a height of a fuel tank inlet, or a size of the fuel tank inlet;
   (g) loading of cargo, catering, or equipment according to the specific servicing program including one or more of: a height of an access opening, or a size of the access opening; or
   (h) coupling a mobile aircraft passenger stairway according to the specific servicing program including access door height.

* * * * *